Sept. 18, 1951     L. P. C. J. DUDLEY     2,568,327
STEREOSCOPIC PHOTOGRAPHY AND KINEMATOGRAPHY
Filed Oct. 1, 1948     4 Sheets-Sheet 1
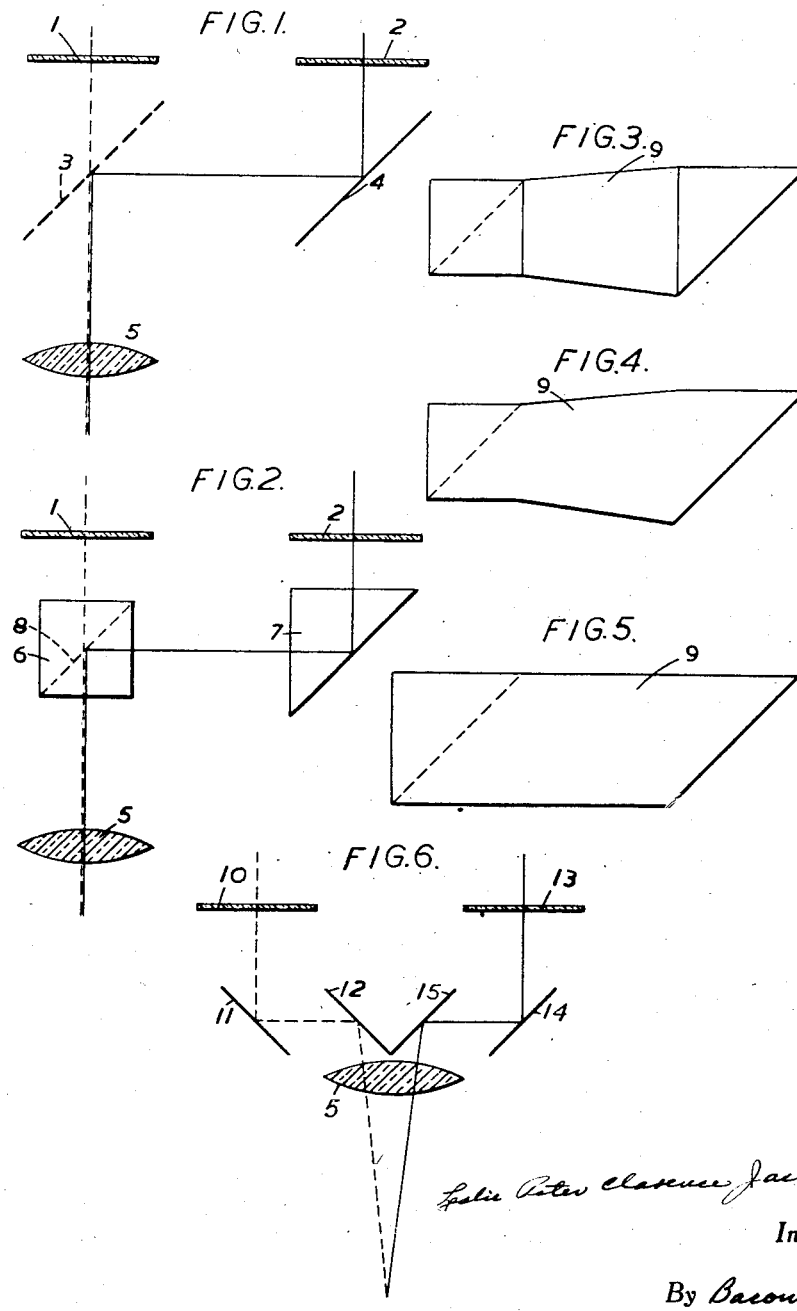

Sept. 18, 1951     L. P. C. J. DUDLEY     2,568,327
STEREOSCOPIC PHOTOGRAPHY AND KINEMATOGRAPHY
Filed Oct. 1, 1948     4 Sheets-Sheet 2
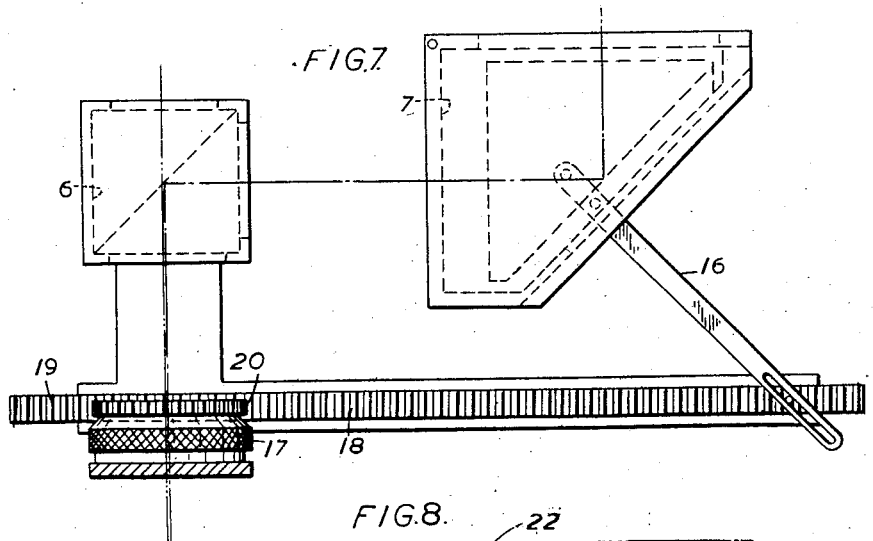
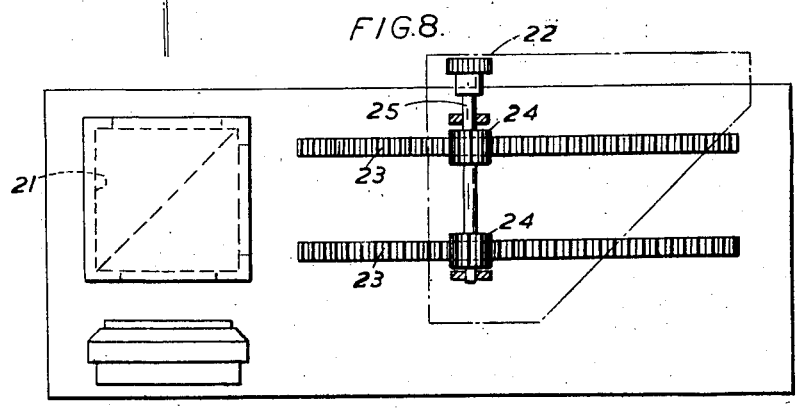
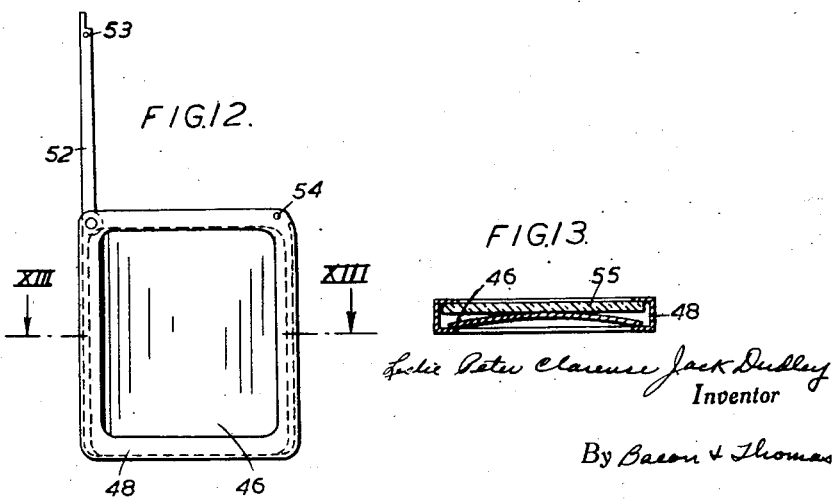

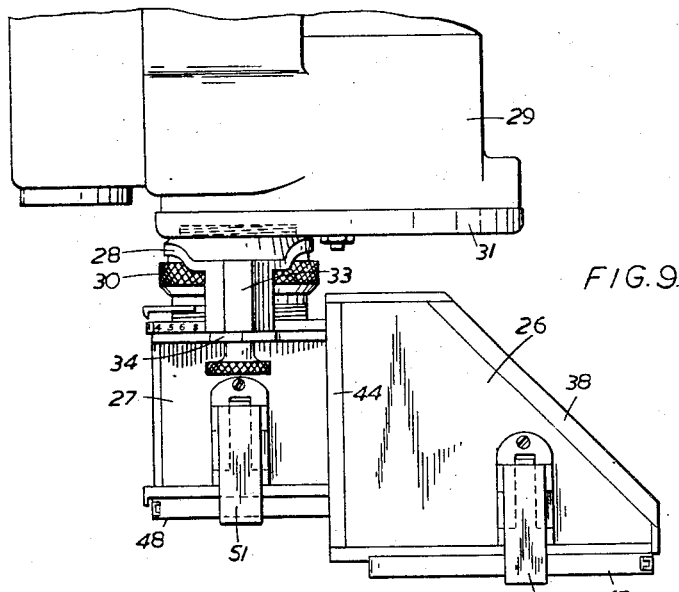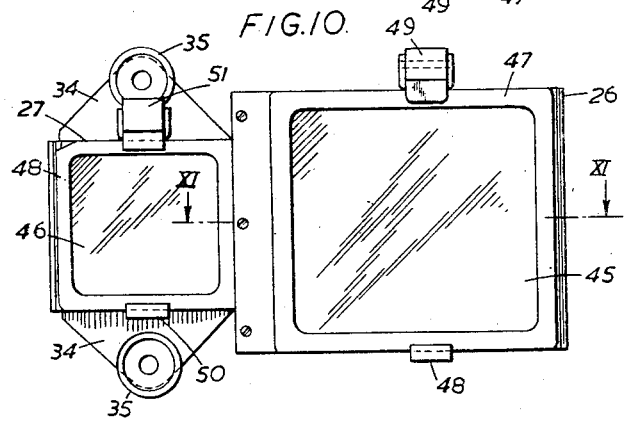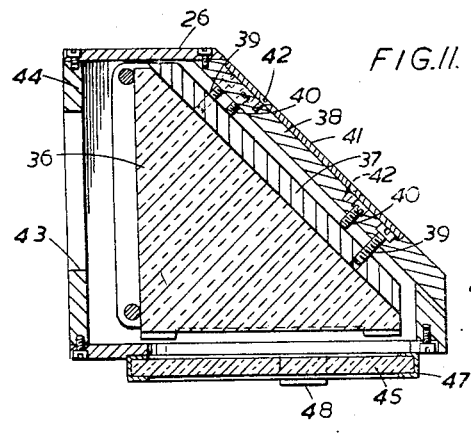

Sept. 18, 1951 L. P. C. J. DUDLEY 2,568,327
STEREOSCOPIC PHOTOGRAPHY AND KINEMATOGRAPHY
Filed Oct. 1, 1948 4 Sheets-Sheet 4
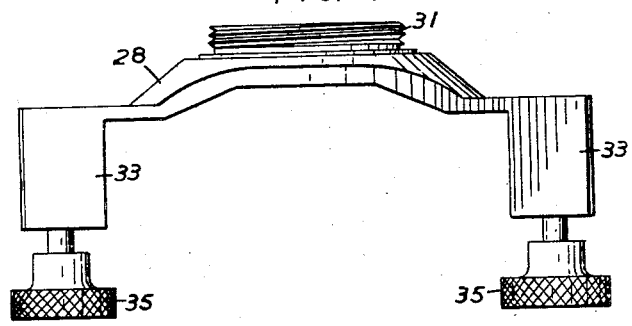
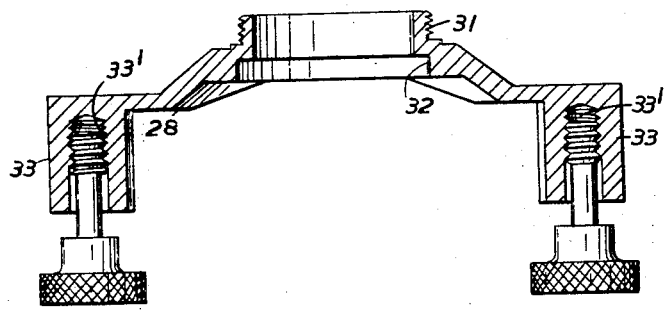
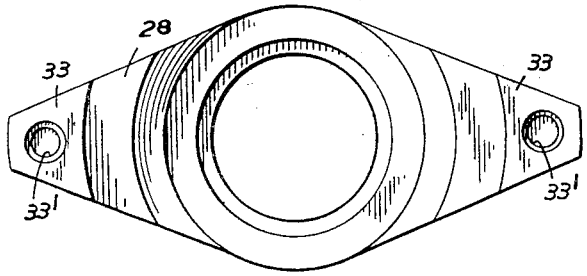
Leslie Peter Clarence Jack Dudley
Inventor
By
Attorneys Patented Sept. 18, 1951

2,568,327

UNITED STATES PATENT OFFICE 2,568,327

STEREOSCOPIC PHOTOGRAPHY AND KINEMATOGRAPHY

Leslie Peter Clarence Jack Dudley,
Twickenham, England

Application October 1, 1948, Serial No. 52,207
In Great Britain October 2, 1947

1 Claim. (Cl. 95—18)

This invention relates to improvements in stereoscopic photographs of the kind known as anaglyphs.

An anaglyph is made by producing photographically on the same sheet a stereoscopic pair of images corresponding to a left-eye view and a right-eye view respectively, the two images being superposed so that they coincide as nearly as possible and the colour of one image being complementary to that of the other. For example one image is red and the other blue-green. The anaglyph is viewed through a pair of spectacles or a similar device having tinted lenses corresponding to the complementary colours of the images so that the observer's eyes each receive light only from the appropriate left-eye view or right-eye view and the resultant images on the retinas are fused binocularly to produce a stereoscopic effect. Anaglyphs may be produced as transparencies for optical projection on a screen and the kinematograph films can be made in which each frame is an anaglyph so that stereoscopic motion pictures can be projected and observed through a suitable coloured viewing device.

It has previously been proposed to produce stereoscopic anaglyphs indirectly by printing superposed images from a stereoscopic pair of negatives, and directly by exposing colour-sensitive photographic material with the aid of a camera having two objectives.

One of the objects of the present invention is to provide a simple and efficient optical device which enables a camera having a single objective to be used in the direct production of stereoscopic anaglyphs.

According to one feature of the present invention there is provided an optical device comprising laterally spaced optical reflecting means disposed for causing left-eye views and right-eye views to become superposed for recording on a photographic film or plate, and means for supporting colour filters in association with said optical reflecting means so that when the device is in use the left-eye image is formed by light passing through one of the filters and the right-eye image is formed by light passing through the other of said filters.

The aforesaid optical reflecting means employed in a device in accordance with the present invention may be of various kinds. Thus for instance I may provide a pair of reflectors, one reflector of said pair being capable of transmitting light directly from one of the said filters and of reflecting and transmitting light in the same or substantially the same direction from the other reflector and filter. Such reflectors may be front-surfaced mirrors, the component adapted for transmitting and reflecting incident light being of the so-called half-silvered type. In such an arrangement the last mentioned mirror may be of a kind designed for transmitting and reflecting incident light to the same or substantially the same extent or it may be designed to accommodate any difference in density between the two filters and/or any differences in sensitivity of the photographic emulsion to light of different colours. It is possible to effect this compensation by the use of one or more neutral filters but such methods are less efficient than the aforementioned owing to the fact that they result in an unnecessary reduction of the light reaching the sensitive surface.

Instead of employing a front-surfaced mirror and a half-silvered mirror as the optical reflecting means I may employ any suitable arrangement of prisms or a combination of mirrors and prisms. Thus I may employ a composite prism consisting of two parts cemented together and having a half-silvered surface on one of the contacting faces as the component for transmitting light from one filter directly and light from the other filter by reflection. In yet another arrangement I may employ optical reflecting means comprising at least two mirrors or prisms for reflecting light from one filter and at least two mirrors or prisms for reflecting light from the other filter, the whole of the light from both filters thus forming the required superposed images by double reflection.

The aforesaid reflectors may be rigidly fixed with respect to one another in the required laterally spaced positions but I prefer to mount at least one of these in a manner such that it is angularly adjustable about a vertical axis as this facilitates the accurate superposing of the two images irrespective of the distance of the particular object to be photographed. If views of far-distant objects only are required then the reflecting surfaces should be substantially at 45° with respect to the axes of the filters. If nearer objects are to be photographed and if the reflectors remain in this position then the images resulting from light passing through the respective filters will move from a condition of superposition to an extent which increases as the object nears the optical device and any required compensation can be obtained by angular adjustment of one or both of the reflectors. Such adjustment may be effected independently of any adjustment of the camera to which the present invention may be applied but it is within the scope of the present invention to provide means whereby such adjustment is effected automatically by the adjustment of the focussing of the camera.

If desired provision may also be made for varying the stereoscopic base of the device by varying the lateral displacement between the two reflecting surfaces in those cases where only two reflectors are employed, or between the two outer reflecting surfaces in cases where more than two reflectors are employed.

A device according to the present invention may be built integrally into the construction of a camera having a single objective or it may be in the form of an attachment suitable for ready application to an existing camera. In the latter arrangement the attachment may embody a suitable lens or lens system for replacing the lens or lens system already on the camera, or such attachment may be adapted for cooperation with the existing lens or lens system of the camera.

The films or plates for use in a camera modified or fitted with an attachment in accordance with the present invention may be of a type which is sensitive only to two complementary colours and having a sharp cut-off with respect to light differing in wave-length even slightly from the wave-lengths of these two colours, so promoting the production of a picture which is seen stereoscopically and in monochrome when viewed through suitable coloured spectacles, the colour of one filter of which is complementary to that of the other. Alternatively, and in general preferably, the films or plates may be of a type which is fully colour-sensitive. Polychromatic stereoscopic pictures can be produced by the use of films or plates of this kind in conjunction with complementary colour filters, in both the photographing and viewing operations, each filter being capable of transmitting light covering a comparatively wide band of wave-lengths. This type of film also enables a monochrome result to be produced if the said filters used in either the photographing or viewing operation or both have a sharp cut-off as hereinbefore defined.

The means for supporting the aforesaid colour-filters preferably comprise frames detachably fitted to the device and such frames may, if desired, be adapted to receive the filters in such a way that the latter can easily be removed or inserted, thus enabling filters appropriate to any particular circumstances to be easily fitted. Thus for instance the required filter-receiving frames may be detachably secured to the device by means of clips and each of such frames may be of rectangular form or have a side opening through which a filter can be inserted or removed at will.

In order that the present invention may be well understood I will now describe, by way of examples only, some embodiments thereof with reference to the accompanying drawings in which:

Figures 1 to 6 are plan views showing six different forms of optical means suitable for use in apparatus in accordance with the present invention, Figure 7 is a plan view showing one method by which angular adjustment of one of the optical components is automatically correlated with the focussing adjustment of the associated camera objective, Figure 8 is a plan view showing one method of providing for adjustment of the stereoscopic base of the device, Figure 9 is a plan view of one specific form of attachment embodying the present invention, Figure 10 is a front elevation of the device shown in Figure 9, Figure 11 is a sectional view taken on the line XI—XI of Figure 10, Figure 12 is a front elevation, drawn to an enlarged scale, of the smaller of the filters, turned through 90°, and having its frame in an opened condition, Figure 13 is a sectional view taken on the line XIII—XIII of Figure 12, Figure 14 is a side view, on an enlarged scale, of the bracket shown in Figure 9, Figure 15 is a cross-sectional plan view of the bracket shown in Figure 14, and Figure 16 is front elevation of the said bracket with the clamping screws removed.

In the arrangement shown in Figure 1, the optical device comprises two laterally spaced colour filters 1 and 2, two reflectors 3 and 4 and a camera lens 5. The filters 1 and 2 are such that the colour of the light passing through one of them is complementary to the colour of the light passing through the other and they are disposed side by side in the same plane and laterally spaced by a distance equal to the normal interocular distance, that is about 2½ inches. The reflectors 3 and 4 consist of mirrors, the mirror 4 being fully reflecting and the mirror 3 being of the so-called half-silvered type. The said mirrors 3 and 4 are arranged one behind each filter and parallel or substantially parallel to and facing each other at an angle of 45° or substantially 45° to the surface of the filters. The half-silvered mirror 3 and its associated filter 1 are on the optical axis of the camera so that the camera objective can receive directly light passing through the filter 1 and reflector 3, and can also receive light passing through the filter 2 and reflected by the mirror 4 and the half-silvered mirror 3.

When a colour-film or similar photo-sensitive material is exposed in a camera fitted with the above-described optical device, it will receive superposed images corresponding to a left-eye view and a right-eye view respectively. One image will be produced by light passing through the filter on the optical axis of the camera and, with slight lateral displacement, through the half-silvered mirror behind it, and the other image will be produced by light passing through the other filter and reflected twice at right angles, first by the associated full-silvered mirror, and then by the half-silvered mirror. After processing the colour film will bear a stereoscopic pair of superposed images in complementary colours.

In the arrangement shown in Figure 2, prisms 6 and 7 are employed as the reflectors, the prism 7 being disposed for reflecting light through 90°, and the prism 6, i. e. the one corresponding to the half-silvered mirror of the arrangement shown in Figure 1, being of cubic form and comprising two 45° prisms cemented or otherwise secured with the hypotenuse faces 8 towards one another and having one of such faces half-silvered.

Instead of using separate prisms as shown in Figure 2, an optically equivalent single prism of a composite nature may be employed. In Figures 3 to 5 there are shown three forms of composite prism 9 which comprise components similar to those shown in Figure 2 but instead of being separated, such components are bridged by glass or other suitable light-transmitting medium. In the arrangement shown in Figure 3, the intervening portion is cemented or otherwise secured to separate end portions, whilst in the arrangement shown in Figure 4 the intervening portion is formed integrally with the 45° end portion, and in the arrangement shown in Figure 5 it is formed integrally with both end portions. It will be understood however that in yet another arrangement the intervening portion can be formed integrally with the adjacent part of the composite end portion only.

If the end portions of the composite prism are of the minimum dimensions appropriate for accommodating the fields of the respective filters then the respective end portions will be of different dimensions and the intervening portion will be of tapered form as shown in Figures 3 and 4. In order to avoid irregularities in the shape of the so-formed prism one end of such prism may, as shown in Figure 5, be of greater dimensions than is optically necessary, so resulting in the complete prism being of trapezoidal form.

In Figure 6 is shown an optical device equivalent to those already described but avoiding the use of a half-silvered reflector. In this arrangement the light passing through the filter 10 to the camera objective 5 is reflected by the mirrors 11 and 12, whilst light passing through the filter 13 to such objective is reflected by the mirrors 14 and 15.

Figure 7 shows one method of providing for automatic adjustment of the optical device in correlation with the focussing adjustment of the associated camera. In this figure the optical device comprises prisms, similar to those shown in Figure 2 and accordingly designated by the same reference numerals, but the prism 7 is mounted on an arm 16, which is mounted for pivotal movement in a horizontal plane. The angular position of the prism 7 can accordingly be varied by swinging the arm 16, and in order to achieve automatic adjustment of such arm it is coupled to the focussing ring 17 of the objective of the associated camera. Such coupling may, as shown, comprise a bar 18 having rack teeth 19 for engagement by a toothed annulus 20 extending from the focussing ring 17.

Figure 8 shows one way in which the stereoscopic base of an optical device in accordance with the present invention may be varied. In this arrangement the optical device comprises two prisms 21 and 22 similar to those described with reference to Figure 2, but the prism 22 instead of being fixedly mounted with respect to the prism 21 is mounted on a carriage having two rails 23, 23, such rails being provided with rack teeth which are engaged by pinions 24, 24. The said pinions are mounted on a spindle 25 which is journalled in a stationary part of the device, and the distance between the prisms 21 and 22 can accordingly be varied by rotating the said spindle.

In Figures 9 to 13, which show one form of stereoscopic attachment for a kinematographic camera, the attachment includes a part 26 constituting a housing for one of the reflectors, a part 27 constituting a housing for the other reflector and a bracket 28 for enabling the whole device to be easily secured to a camera, a portion of such camera being shown in Figure 9 and designated 29.

The said attachment embodies an objective for the camera in which the device is to be fitted, the focussing ring 30 of said objective being shown in Figure 9. Such attachment is adapted to be easily fitted to a camera after removing from such camera the objective normally provided. The camera, of which a part is shown in Figure 9, includes a turret 31 and the screw-threaded hub 31 (see Figures 14 and 15) of the bracket 28 is adapted to make screw-threaded engagement with the screw-threaded socket in the turret, i. e. the socket which normally makes engagement with the camera objective.

The hub 31 of the bracket 28 is provided with an internally stepped portion 32 which makes a snug fit with a correspondingly stepped end of the housing for the camera objective. The said bracket is further provided with forwardly extending arms 33, 33 against which side flanges 34, 34 of the housing 27 are adapted to abut, the said flanges being provided with apertures for slidably receiving clamping screws 35, 35 and the side arms 33, 33 being provided with screw-threaded apertures 33', 33' adapted to register with the apertures in the flanges 34 and to receive the screw-threaded ends of the said clamping screws 35, 35.

When it is desired to fit the stereoscopic attachment to a camera the bracket 28 is first fitted into the objective-receiving opening of the camera and the body of the attachment is then secured to the bracket.

The reflecting means employed in the said attachment are similar to those shown in Figure 2, the 45° prism being located in the housing 26 and the composite prism being located in the housing 27. The prism located in housing 26 is shown in Figure 11 and designated 36.

The said prism 36 is mounted in a frame including a back plate 37, and such back plate is secured to the rear member 38 of the housing 26 by means of three screwed studs, two of such screws appearing in Figure 11 and being designated 39. The screws 39 pass freely through apertures in the rear member 38 and make screw-threaded engagement with apertures in the back plate 37 and adjustable abutments are provided between the said parts 37 and 38. Such abutments consist of three grub screws, two of which are shown in Figure 11 and designated 40. Two of the screws 39 are located in vertical alignment and near the back of the casing, one being near the top and the other near the bottom of such casing, whilst the third screw 39 is located near the front of the casing and midway between the top and bottom edges. One of the studs 40 is located near the back of the casing and midway between the screws 39 and the other two studs are located in vertical alignment near the front of the casing. This arrangement of screws and studs enables the prism 36 to be angularly adjusted in a horizontal plane, i. e. the studs 40 can be set so that their inner ends lie in the plane in which the back plate 37 is to be located and the screws 40 can be tightened to lock the prism firmly against the said ends of the studs.

Once the position of the prism 36 has been properly set it is desirable to take precautions for preventing any inadvertent movement of the adjusting screws. For this purpose the back 38 of the casing 26 may be recessed as shown in Figure 11, and a cover plate 41 may be inserted in such recess so as to cover the said screws 39 and studs 40, such cover plate being itself secured in position by means of screws 42.

An aperture 43 is provided in the wall 44 disposed between the housings 26 and 27 and further apertures are provided in the front walls of the said housings. A filter 45 is disposed over the front aperture of the housing 26, and a filter 46, of a colour complementary to that of the filter 45, is disposed over the front aperture of the housing 27. The filters 45 and 46 are removably located in mountings 47 and 48 respectively, the said mountings being themselves detachably fitted to the respective casings. The means for securing the mounting 47 consist of a fixed clip 48 and a pivotally mounted clip 49, similar clips 50 and 51 being provided for detachably securing the mounting 48.

The mountings 47 and 48 are of similar construction and detail views of the mounting 48, drawn to a slightly larger scale, are shown in Figures 12 and 13. As will be seen from these figures, the mounting comprises integral side and base members of channel-like cross-section, and a pivotally mounted top member 52 also of channel-like cross-section. The forward ends of the side flanges of the top member 52 are provided with small projections 53 which are adapted to cooperate with apertures 54 in the body of the mounting for the purpose of opposing any inadvertent opening of the filter housing.

The filter 46 consists of a piece of suitably coloured transparent film and this is protected and reinforced by means of a glass plate 55.

Whilst I have hereinbefore described some embodiments of the present invention I wish it to be understood that there may be various changes without departing from the scope thereof. Thus for instance the reflectors may be of kinds other than those specifically mentioned. It is also to be understood that the said optical system may be mounted in any suitable housing and any suitable means may be provided for enabling such housing to be secured to a camera. The invention is, moreover, applicable to various different kinds of cameras including cameras for taking still pictures as well as cameras for taking kinematographic pictures.

I claim:

An optical device for enabling a camera having a single objective to be used in the direct production of a stereoscopic anaglyph, said device having a focusing control means comprising a rotatable, hand operated focusing ring, light reflecting means having an adjustably mounted component movable to different positions to enable accurate superposing of images in said camera of the left-eye view and the right-eye view of an object, means comprising a mechanical linkage coupling said rotatable, hand operated focusing ring so that adjustment of the reflecting means is effected automatically by the operation of focusing the camera, the said adjustably mounted component being mounted for pivotal movement on said device about a vertical axis and the said mechanical linkage comprising a pinion associated with said focusing ring, a rack engageable with said pinion and a lever carried by said adjustably mounted component and connected to said rack.

LESLIE PETER CLARENCE JACK DUDLEY.

REFERENCES CITED

The following references are of record in the file of this patent:

UNITED STATES PATENTS

| Number | Name | Date |
| --- | --- | --- |
| 835,648 | Straubel | Nov. 13, 1906 |
| 1,479,211 | Ames | Jan. 1, 1924 |
| 1,479,212 | Ames | Jan. 1, 1924 |
| 2,022,454 | Barnes | Nov. 26, 1935 |
| 2,056,600 | Crozier | Oct. 6, 1936 |
| 2,150,626 | Kuppenbender | Mar. 14, 1939 |
| 2,235,743 | Gagliardi | Mar. 14, 1939 |
| 2,360,322 | Harrison | Oct. 17, 1944 |
| 2,362,790 | Austin | Nov. 14, 1944 |
| 2,365,212 | Oriol | Dec. 19, 1944 |